Aug. 23, 1960  V. DI MAIO ET AL  2,949,953
PIPE INSULATOR AND METHOD OF MAKING SAME
Filed May 26, 1955  2 Sheets-Sheet 1
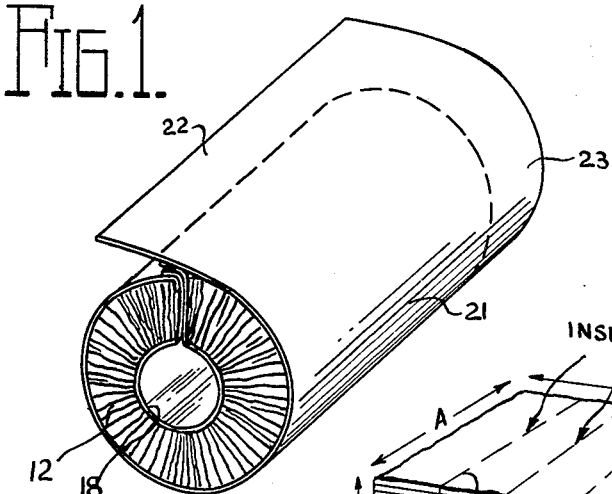
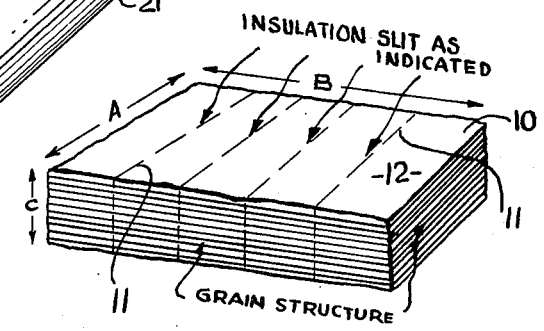
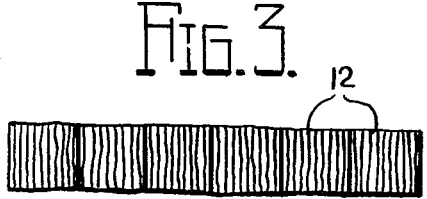
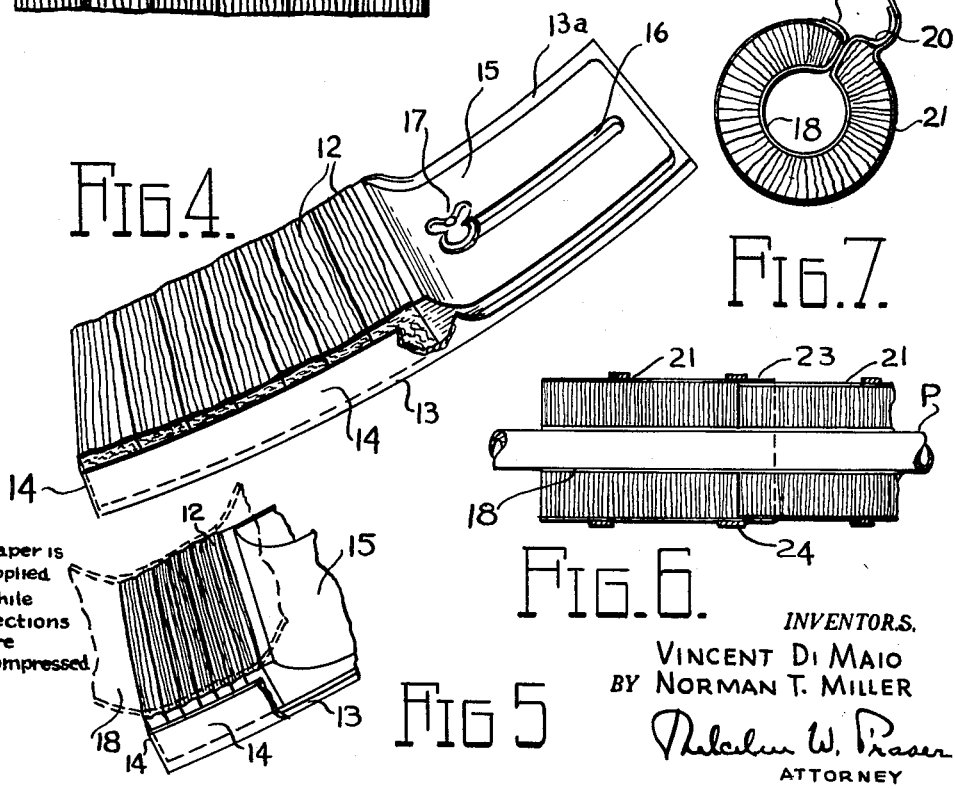
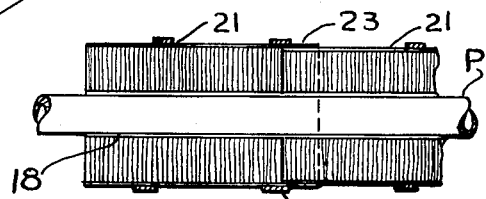
INVENTORS.
VINCENT DI MAIO
BY NORMAN T. MILLER
Malcolm W. Fraser
ATTORNEY

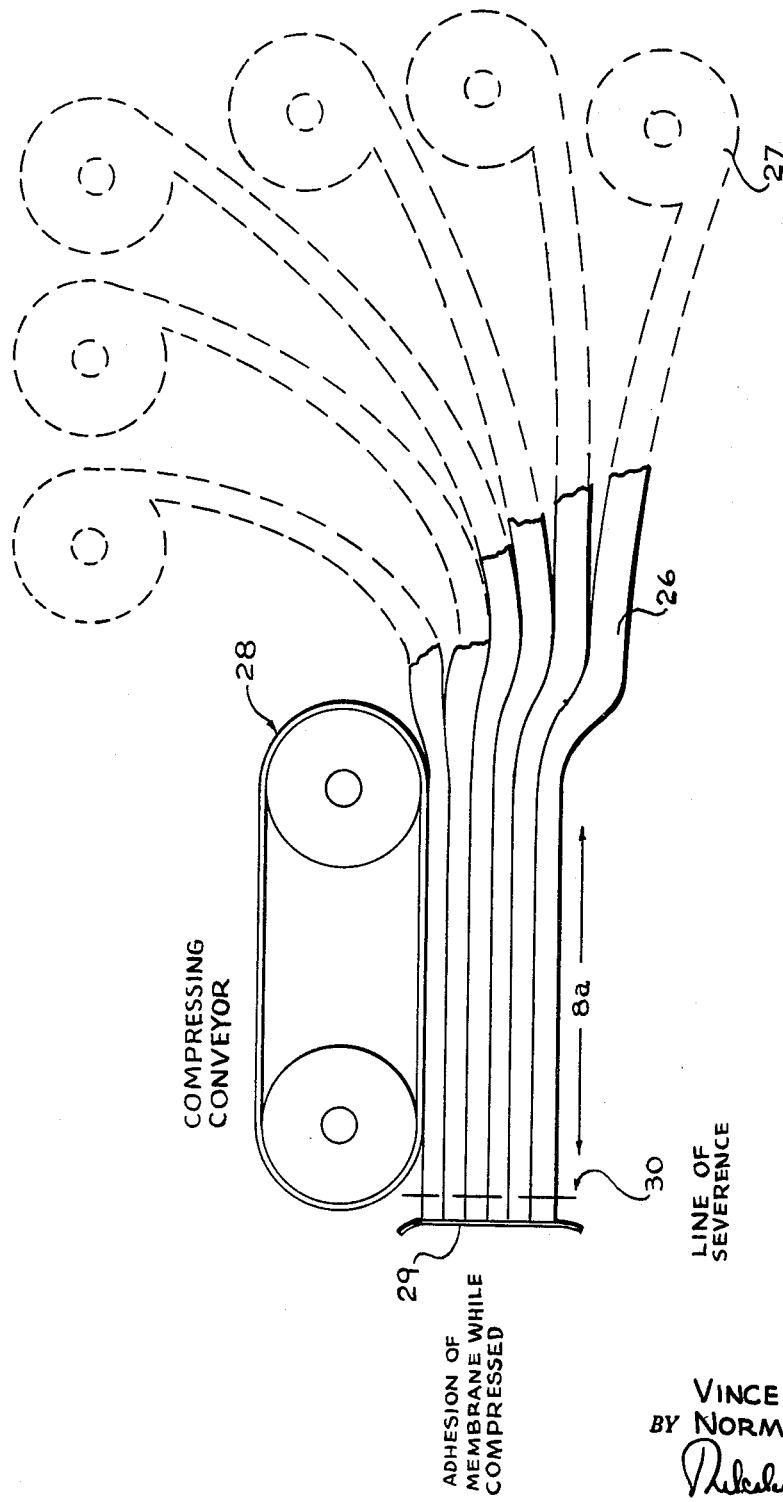

United States Patent Office 2,949,953
Patented Aug. 23, 1960

2,949,953

PIPE INSULATOR AND METHOD OF MAKING SAME

Vincent Di Maio, 521 Clifton St., and Norman T. Miller, 348 Irving St., both of Toledo, Ohio Filed May 26, 1955, Ser. No. 511,166

9 Claims. (Cl. 154—28)

This invention relates to a novel insulating packing for pipes or the like, which can be readily and conveniently snapped onto the pipes and is further concerned with simple and efficient methods for manufacturing such insulating packing.

One manner of insulating pipes which is widely used at this time is to apply a suitable thickness of asbestos or glass fibers about the pipe which it is desired to insulate and then enclose such fibers with a flexible sheet covering. The covering material is then held in place by a series of metallic bands which are wrapped at intervals about the packing. This somewhat crude method, although it ultimately provides a satisfactory insulation, is quite costly due to the time consumed in applying the hand-made insulating device and is quite messy due to the hit or miss application of the insulating fibers.

Another method which has been employed and which is somewhat of an improvement on the above method is to mold or heat form the fibrous insulating material; for example in segments, or in annulus form, apply the same to the pipes and hold them in place by wrapping bands or the like at intervals. This too is quite costly to produce and is time consuming in its application to the pipes.

This invention obviates the difficulties above mentioned and provides an inexpensive snap on pipe insulation packing which can be applied by an unskilled person almost instantly, is considerably less expensive and provides an insulation which is uniform in density throughout. The invention also contemplates novel methods for producing such pipe insulation packing whereby it can be economically manufactured on a large scale production basis.

Other objects and advantages of the invention will hereinafter appear and, for purposes of illustration but not of limitation, embodiments of the invention are shown on the accompanying drawings in which:

Figure 1 is an end perspective view of the pipe insulation packing in its completed state;

Figure 2 is a perspective view of a sheet of insulating material showing the manner in which it is slit or cut to provide the sections from which the packing is formed;

Figure 3 is an end view showing a series of block-like sections or strips of insulating material properly arranged in side by side relation prior to the compressing step;

Figure 4 is a top perspective view of a jig showing a series of insulating sections disposed therein, preparatory to the compressing step;

Figure 5 is a fragmentary top perspective view of the jig showing the insulating sections in compressed condition and indicating the flexible sheet material being applied while the sections are retained in their compressed state;

Figure 6 is a longitudinal sectional view showing a pair of packing units applied to a pipe and indicating the manner in which the covering sheet of one packing overlaps the adjacent packing;

Figure 7 is an end view of a packing unit; and

Figure 8 is a diagrammatic side elevation showing an alternate method of forming the pipe insulator which lends itself admirably to large quantity production.

Referring to the drawings, 10 represents a laminated sheet of glass fibers (known in the trade as flexible B fiber) which ordinarily comes in a large roll and the fiber being suitably bonded to provide a self sustaining mass. The fibers run generally in the direction of the length of the roll and referring to Figure 2, the fibers generally run from front to back in the direction indicated by the arrows A. As a consequence, such sheet is not resiliently compressible in the direction indicated by the arrows A nor in the direction of the arrows indicated by B. On the other hand, the sheet is resiliently compressible in the direction of the arrows indicated at C. Although glass fibers are imminently satisfactory in this connection, other fibrous insulating materials may be advantageously employed, for example asbestos fibers, foam rubber or any other resilient compressible material having thermal insulating characteristics. In any event, regardless of the insulation employed in this connection, it is desirable that the sheet has the resiliently compressible and non-compressible characteristics as above indicated.

The sheet of insulating fibers 10 is slit from front to back along the lines 11 to provide a series of block-like sections or strips 12 which, as shown, are substantially square in cross section. After the strips 12 have been severed, they are placed in side to side relation as indicated on Figure 3 so that the series of sections is compressible resiliently in a horizontal direction as viewed in the figure and, of course, resist compression in an up and down direction. The number of sections 12 selected is controlled by the circumference of the pipe to be insulated, it being important before compression that the length should be greater than the pipe circumference. Such assembly of sections 12 is then placed in a jig 13 which has a slightly curved or concave bottom wall or mandrel 13a, a pair of upstanding side walls and an end wall 14. Slidable over the mandrel 13a is a compressing slide 15 which in any suitable manner is forced to the left of Figure 4 to compress the several sections as indicated on Figure 5. An initial compression of approximately 20% is satisfactory and after being so compressed, the compressed sections are retained from expanding, and for this purpose, the slide 15 has an elongate slot 16 through which an adjusting thumb-screw 17 extends and which, when tightened holds the slide in the compressed position.

While so held under compression, a sheet 18 is adhesively attached to the upper compressed edge portions of the several sections. Although the sheet may be of various materials such as cloth or thin sheet metal, a satisfactory material is a 30# multi-ply sheet having outer layers of kraft paper with an intermediate asphalt layer. Manifestly a sheet of this character, which intimately engages the pipe to be insulated, provides an efficient vapor proof seal. A satisfactory adhesive for securing the sheet 18 to the several insulating sections 12 and which is moisture resistant, is a nitrile rubber cement which is activated by the application of a hot iron to the sheet. It will be observed that the ends of the sheet project beyond the ends of the compressed assembly.

After the cement has properly dried, the slide 15 is released and the packing unit is removed from the jig. Due to the resiliency of the insulating material as above described, as soon as the assembly is released, it will automatically and instantly assume an annular form, as indicated on Figures 1 and 7. This is because the inner edge portions are retained in the compressed condition by the adhesive connection with the sheet 18, allowing the remainder of the insulating sections to fan into an annular form. The structure can be readily opened up in order to apply the packing to a pipe.

A covering sheet 21 is loosely applied to the insulator and this sheet is also of flexible material such as paper, cloth, metal or the like. As shown in Figure 7, the free end or flap 19 of the sheet 18 has its underside coated with adhesive and this may be laid back over and adhered to the outer side of the covering sheet 21. At the other end of the sheet 18, the flap 20 may have its outer side coated with adhesive so as to adhere to the under side of the adjacent portion of the covering sheet 21. The covering sheet 21 has an extending flap 22 which after the packing is applied to the pipe, is folded over the flap 19 and the adjacent portion of the sheet 21 and adhered in place thereby closing the gap and providing in effect an integral closure for the pipe. The adhesive may also be activated with heat or suitable solvent as will readily be understood.

It will be observed, particularly in Figure 1 that one end portion 23 of the sheet 21 extends substantially beyond the adjacent end of the packing annulus. This portion overlaps an adjacent packing unit, as indicated in Figure 6. Such overlapping portion may be adhesively connected to the adjacent insulator or held in place by suitable metal bands 24, a series of such bands being indicated on Figure 6. It will be understood that the covering sheet 21 is free from the outer radial edges of the insulating strips and is only attached to the flaps 19 and 20 of the inner sheet 18.

An alternate method of making the insulator is shown in Figure 8 in which a selected number of lengths 26 of laminated glass fiber insulating material are advanced from their individual storage rolls 27 respectively in stacked formation, i.e. the several lengths being superimposed as shown. Advancing movement of the several lengths is achieved by an endless belt assembly 28, which additionally compresses the sheets to the desired extent. It will be understood that the grain of the glass fiber sheets extends generally in the directions of the arrows 8a which positions the fibers of the several sheets similarly to that of the sections 12 of Figure 4 so that the pile of sheets are resiliently compressible in a vertical direction as viewed on that figure. The operation of the compressing conveyor 28 is intermittent to enable adhesive and a core sheet 29 to be applied to the exposed end of the compressed pile. After the adhesive has sufficiently set or dried, the pile is severed vertically along the line 30 whereupon the insulator abruptly coils itself into the form shown in Figures 1 and 7. Thereupon the conveyor 28 advances to enable the formation of the next unit. The cover sheet 21 above described is then applied in the manner described to complete the insulator unit. Manifestly, the above method lends itself to large quantity production in a satisfactory and economic manner.

From the above description, it will be manifest that we have produced an exceedingly simple pipe packing which can be readily and conveniently applied in position of use by a snap-on manner, it being merely necessary to open up the packing sufficiently to admit the pipe and then release the insulator so that it will snap abruptly in embracing relation. Then the flap 22 is adhered in place and conveniently the bands or wire fasteners 24 are applied at intervals. The use of the bands or wires 24 may be dispensed with if desired since the packing units are self-sustaining and due to the overlap of the portion 23, one packing is securely and effectively attached to an adjacent one. Due to the "edge grain" lamination of the individual strips which form the several sections of the packing, the differences between the inside and outside diameters of the covering are uniformly absorbed without kinks, thus producing smooth inner and outer surfaces. The same edge lamination of the packing produces a greater compressive strength and achieves the same effect as an increase in the density of the insulation.

Numerous changes in details of construction, arrangement and choice of materials may be effected without departing from the spirit of the invention, especially as defined in the appended claims. It should be understood that under some circumstances the core sheet 18 may be dispensed with and instead of cement, mechanical means such as staples may be used to retain the inner edge portion of the core in compressed condition.

What we claim is:

1. Pipe insulating packing comprising a split annulus-like structure having a mass of fibers which are compressible and resilient in the cylindrical direction of the structure, and flexible sheet material adhesively secured to the inner edge portion of the structure for confining the radially innermost portion of the annulus core in intimately compressed condition with the remainder or radially outer portion of the annulus free, whereby the portion of the structure outside of the compressed portion due to the resiliency of the fibrous mass fans out into circular form, the structure being openable at the split and the resiliency enabling the same to snap to substantially closed annular form upon being released.

2. Pipe insulating packing comprising a split annulus-like structure having a mass of fibers which are compressible and resilient in the cylindrical direction of the structure, flexible sheet material adhesively secured to the inner edge portion of the structure for confining the radially innermost portion of the annulus core in intimately compressed condition with the remainder or radially outer portion of the annulus free, whereby the portion of the structure outside of the compressed portion due to the resiliency of the fibrous mass fans out into circular form, the structure being openable at the split and the resiliency enabling the same to snap to substantially closed annular form upon being released, and extensions on the sheet material covering the meeting edges of the annulus at the split and projecting beyond the outr side of the structure.

3. Pipe insulating packing comprising a split annulus-like structure having a mass of fibers which are compressible and resilient in the cylindrical direction of the structure, flexible sheet material adhesively secured to the inner edge portion of the structure for confining the radially innermost portion of the annulus core in intimately compressed condition with the remainder or radially outer portion of the annulus free, whereby the portion of the structure outside of the compressed portion due to the resiliency of the fibrous mass fans out into circular form, the structure being openable at the split and the resiliency enabling the same to snap to substantially closed annular form upon being released, extensions on the sheet material covering the meeting edges of the annulus at the split and projecting beyond the outer side of the structure, and a cover of flexible sheet material loosely embracing the annulus and secured respectively to the projecting portions of the extensions.

4. Pipe insulating packing comprising a split annulus-like structure having a mass of fibers which are compressible and resilient in the cylindrical direction of the structure, flexible sheet material adhesively secured to the inner edge portion of the structure for confining the radially innermost portion of the annulus core in intimately compressed condition with the remainder or radially outer portion of the annulus free, whereby the portion of the structure outside of the compressed portion due to the resiliency of the fibrous mass fans out into circular form, the structure being openable at the split and the resiliency enabling the same to snap to substantially closed annular form upon being released, extensions on the sheet material covering the meeting edges of the annulus at the split and projecting the outer side of the structure, and a cover of flexible sheet material loosely embracing the annulus and secured respectively to the projecting portions of the extensions, said cover projecting axially beyond one end of the structure for enabling an adjacent structure to telescope therewith.

5. Pipe insulating packing comprising a split annulus-like structure having a mass of fibers which are compressible and resilient in the cylindrical direction of the structure, flexible sheet material adhesively secured to the inner edge portion of the structure for confining the radially innermost portion of the annulus core in intimately compressed condition with the remainder or radially outer portion of the annulus free, whereby the portion of the structure outside of the compressed portion due to the resiliency of the fibrous mass fans out into circular form, the structure being openable at the split and the resiliency enabling the same to snap to substantially closed annular form upon being released, extensions on the sheet material covering the meeting edges of the annulus at the split and projecting the outer side of the structure, a cover of flexible sheet material loosely embracing the annulus and secured respectively to the projecting portions of the extensions, and a flap on said cover for covering the split and sealing such interstice.

6. The method of making a hollow cylindrical body which consists in assembling a plurality of bats of glass fibers in side by side relation, the bats being resiliently compressible in directions toward the abutting sides, compressing the assembly so that opposite ends thereof are forced toward each other, applying a moisture resistant adhesive to only one edge portion of the bats which is disposed at right angles to the line of pressure and while under compression, and after the adhesive has set releasing the structure from compression to allow it to snap into annular form.

7. The method of making a hollow cylindrical body which consists in assembling a plurality of bats of glass fibers in side by side relation, the sections being resiliently compressible in directions toward the abutting sides, compressing the assembly so that opposite ends thereof are forced toward each other, applying a sheet of flexible material by a moisture resistant adhesive to only one edge portion of the bats which is disposed at right angles to the line of pressure and while under compression, and after the adhesive has set releasing the structure from compression to allow it to snap into annular form.

8. The method of making a hollow cylindrical body which consists in assembling a plurality of bats of glass fibers in side by side relation, the sections being resiliently compressible in directions toward the abutting sides, compressing the assembly so that opposite ends thereof are forced toward each other, applying a sheet of flexible material by a moisture resistant adhesive to only one edge portion of the bats which is disposed at right angles to the line of pressure and while under compression, and after the adhesive has set releasing the structure from compression to allow it to snap into annular form, applying an embracing cover sheet loosely about the structure and securing the end portions of the cover sheet to the ends of said first sheet.

9. The method of making a hollow cylindrical body which consists in concomitantly and intermittently advancing a series of endless bats of glass fibers in superposed relation, each sheet being resiliently compressible in directions of the thickness thereof, compressing the several bats simultaneously, adhesively applying a sheet to the exposed edge portions of the compressed pile of bat during intervals between advancing movement of the bats, and severing the bats along a line rearwardly of and parallel to such exposed edge portions.

References Cited in the file of this patent

UNITED STATES PATENTS

| | | |
|---|---|---|
| 231,832 | Merriam | Aug. 31, 1880 |
| 347,631 | Merriam | Aug. 17, 1886 |
| 397,822 | Suhr | Feb. 12, 1889 |
| 616,479 | Martin | Dec. 27, 1898 |
| 775,537 | McConnell | Nov. 22, 1904 |
| 1,924,472 | Thomson | Aug. 29, 1933 |
| 2,373,500 | Pearce | Apr. 10, 1945 |
| 2,778,405 | Stephens et al. | Jan. 22, 1957 |
| 2,784,129 | Stephens | Mar. 5, 1957 |